United States Patent [19]

Ward, III et al.

[11] 4,082,429
[45] Apr. 4, 1978

[54] APPARATUS FOR COPYING GRAPHIC IMAGES INCLUDING THE PROCESSING OF INCOHERENT RADIATION WITH A SPATIAL FILTER

[75] Inventors: Joseph E. Ward, III, Woodbury, Minn.; John C. Huber, Hudson Twp., St. Croix County, Wis.

[73] Assignee: Minnesota Mining and Manufacturing Company, St. Paul, Minn.

[21] Appl. No.: 699,785

[22] Filed: Jun. 25, 1976

Related U.S. Application Data

[63] Continuation-in-part of Ser. No. 570,349, Apr. 22, 1975, abandoned.

[51] Int. Cl.² .................. G02B 5/32; G02B 27/38; G03H 1/16
[52] U.S. Cl. .................. 350/162 SF; 350/3.82; 350/205
[58] Field of Search .................. 350/162 SF, 3.5, 205, 350/206; 355/2

[56] References Cited

U.S. PATENT DOCUMENTS

3,370,268  2/1968  Dobrin et al. .................. 350/162 SF

OTHER PUBLICATIONS

Lanzl et al., OPTIK, vol. 35, No. 5, 1972, pp. 524–535.
Lowenthal et al., Comptes Rendus Acad. Sc. Paris, Series B, vol. 266, Feb. 1968, pp. 542–545.
Goodman, Introduction To Fourier Optics, Mc Graw–Hill Book Co., 1968, pp. 165–166.

*Primary Examiner*—Ronald J. Stern
*Attorney, Agent, or Firm*—Cruzan Alexander; Donald M. Sell; William B. Barte

[57] ABSTRACT

A linear optical processing system for copying graphic images which includes a spatial filter in the form of a Fourier transform hologram together with a lens for processing incoherent electromagnetic radiation. The system provides a given real, substantially-uniform low-pass two-dimensional optical transfer function for spatially filtering incoherent radiation within a range of spatial frequencies $0<\omega<\Omega$. The spatial filter is made by forming a mask representing a point spread function which is the inverse transform of the desired optical transfer function, and employing the mask in a coherent system to produce as the filter a Fourier transform hologram of the mask.

The spatial filter operates on light distributed from an object containing a graphic image illuminated by incoherent light and provides a substantially-uniform low-pass response for passing all spatial frequency components within an interval of spatial frequencies above zero spatial frequency extending to a specified cutoff spatial frequency $\omega_c$. The filter interacts with the lens to provide processed convolution and/or correlation images of such filtered light at a predetermined image plane to provide a graphic image of the object at the image plane in which higher spatial frequencies, within the interval, the reduction of which contribute to degradation or loss of fidelity in multigeneration copies, are substantially unaltered. In one embodiment, the spatial filter provides a plurality of discrete optical transfer functions for respectively filtering a plurality of discrete color components.

6 Claims, 5 Drawing Figures

APPARATUS FOR COPYING GRAPHIC IMAGES INCLUDING THE PROCESSING OF INCOHERENT RADIATION WITH A SPATIAL FILTER

CROSS-REFERENCE TO RELATED CASE

This application is a continuation-in-part of an earlier application, U.S. Ser. No. 570,349, which was filed Apr. 22, 1975, now abandoned and is related to a co-pending U.S. patent application Ser. No. 672,614, filed Apr. 1, 1976, by one of the present inventors, Joseph E. Ward III, entitled "Image Processing System Using Incoherent Radiation and Spatial Filter Hologram", which application is a continuation-in-part of U.S. patent application Ser. No. 570,957, which was filed on Apr. 22, 1975 and which is now abandoned.

BACKGROUND OF THE INVENTION (1) Field of the Invention

The present invention generally relates to image processing utilizing incoherent radiation and is specifically directed to image processing with holographic spatial filters which, when combined with a lens in an optical system, provide a priori specified optical transfer functions.

(2) Description of the Prior Art

The processing of images containing graphic information with spatially incoherent electromagnetic radiation has a distinct advantage over systems utilizing coherent radiation. Much graphic information is printed on paper. In order to process images containing such graphic information with coherent laser-optical systems, the information must be converted into transparency form. With spatially incoherent radiation, graphic images may be processed directly from the paper.

The use of a hologram for pattern detection by correlation filtering in spatially incoherent optical systems was suggested in 1965 by Armitage and Lohmann in Appl. Opts. 4, 461 (1965). This system, including an incorherent light source and a combination of a lens and a spatial filter, is insensitive to shifts in the position of the hologram. Armitage and Lohmann recognized that it is not an easy problem to prescribe first the optical transfer function for the system to be provided by the spatial filter and then look for a suitable pupil function for defining the hologram. The pattern detection application, which utilizes a matched filter initially formed from an image of the pattern to be detected, and which finds utility in shift invarient character recognition, has appeared to be the only exception to this difficult mathematical problem.

Lowenthal and Werts, in Compt. rend. 266 B, 542 (1968), noted that both correlation and convolution image processing operations could be performed with an optical system including a hologram and lens using spatially incoherent light. In particular, they state that when one is given, a priori, the point spread function for an optical system, the required pupil function for the lens may be obtained by recording this point spread function in a hologram. Lowenthal and Werts' only reported application, however, was to employ the correlation operation to recognize alphabetic characters.

Also in 1971, Lohmann and Werlich, in Appl. Opt. 10, 670 (1971), proposed further applications utilizing pattern detection by correlation filtering with spatially incoherent optical systems. Correlations between line drawings and between gray-tone objects were disclosed. However, Lohmann and Werlich stated: "Additional spatial filtering for better target discrimination (such as suppression of the useless low frequencies) cannot be done in incoherent image formation, at least not as straight-forwardly as in the coherent method." Lohmann and Werlich then go on to suggest the use of computer generated Fourier holograms as correlation filtering elements for pattern detection.

Thus, the prior art fails to disclose or suggest how to proceed from specific incoherent radiation correlation techniques to the more general optical processing applications which require an a priori specification of the optical transfer function.

SUMMARY OF THE INVENTION

The present invention provides an apparatus for making copies of graphic images by processing incoherent light with a spatial filter and lens combination. The apparatus includes an optical system for image processing comprising a source of spatially incoherent light positioned for directing such radiation to an object containing a graphic image to provide an intensity distribution of light from the object; a lens for providing a processed image of such light distributed from the object at a predetermined image plane, and includes a spatial filter which, when combined with the lens in the optical system provides a given two-dimensional optical transfer function $F(\omega)$ for spatially filtering the light distributed from the object within an interval of spatial frequencies $0<\omega<\Omega$ for enabling the lens to provide processed convolution and/or correlation images of the filtered light distributed from the object at the predetermined image plane to thereby provide the processed image at the image plane.

Objects containing graphic images may include but are not limited to documents; three-dimensional figures or scenes; self-luminous objects in either one, two, or three dimensions; and transparencies.

In the embodiment described herein, the spatial filter provides a substantially uniform low pass response for passing all spatial frequency components above zero spatial frequency to a specified cutoff spatial frequency $\omega_c$.

The apparatus for making copies of graphic images according to the present invention may be used for high fidelity multiple generation copying. For example, a symbol printed on a page will tend to become diffuse at the edges when a copy is made of a copy. This effect may be eliminated by selecting an optical transfer function which has substantially equal response at all spatial frequencies of interest. This apparatus also can be used to process graphic images which cannot be processed by coherent radiation processors, such as those contained on a sheet of paper.

DESCRIPTION OF THE PREFERRED EMBODIMENTS

Figure 1:
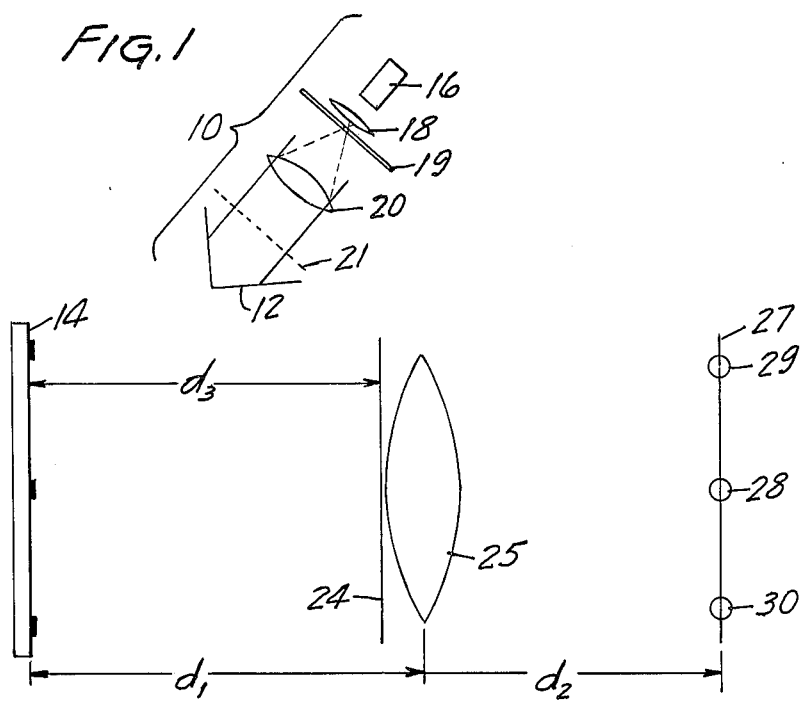
FIG. 1 is a schematic view of an optical system for image processing according to the present invention.

An optical system for image processing in accordance with the present invention is shown in FIG. 1. The system includes a source 10 of spatially incoherent light 12 positioned for directing such light to an object 14 to provide an intensity distribution of light from said object. The source 10 of spatially incoherent radiation may be a reasonably monochromatic light source such as a laser from which the radiation has been rendered spatially incoherent, a filtered mercury arc source, or narrow band phosphors such as those in a cathode ray tube screen. In the preferred embodiment, the incoherent light source 10 includes a laser 16, a microscope objective 18 and pin hole aperture plate 19, a collimating lens 20 and a spinning diffuser 21. The diffuser 21 is frosted glass.

The system of FIG. 1 also includes a spatial filter 24 and a lens 25. It should be recognized that both the spatial filter 24 and the lens 25 can be integral parts of the same hologram. In this embodiment, the lens 25 is a simple imaging lens. The lens 25 also may be a fresnel zone plate or a discrete holographically recorded lens.

The spatial filter 24 provides a Fourier transform hologram of a given two-dimensional optical transfer function $F(\omega)$ for spatially filtering the light distributed from the object 14 within an interval of spatial frequencies $0 < \omega < \Omega$. The optical transfer function is shaped to an a priori specification consistent with incoherent imaging. Also, the optical transfer function may be shaped to approximate other a priori specifications by properly limiting or biasing the corresponding point spread function. Although the optical transfer functions provided in the embodiments described herein utilize rectangular coordinate and circular cylindrical coordinate systems, ellipsoidal, parabolic, spherical, prolate spheroidal and other systems also may be used.

The lens 25 provides three processed images of the filtered light distributed from the object at a predetermined image plane 27. These three images are: the usual geometric image 28 of the object plane graphic, the correlation image 29, and the convolution image 30. In the preferred embodiments of the optical system for image processing described herein, the convolution image is utilized. However, in special cases where the corresponding optical transfer function is symmetrical, i.e., where $h(x,y) = h(-x,-y)$, the convolution and correlation images are identical. If one constructs the intensity distribution mask 32 with $h(-x,-y)$, the roles of the convolution image and correlation image would be reversed.

The convolution and/or correlation images may be detected by some suitable detecting means positioned in the image plane 27 at the convolution image 30 and/or the correlation image 29. Detectors include such means as the eye, a vidicon tube, photographic film, a charge coupled device, or very simple detectors such as a silicon detector.

Figure 3:
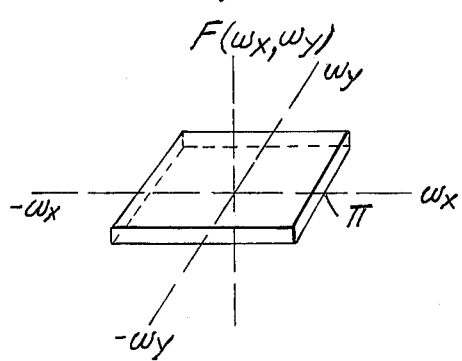
FIGS. 3 and 4 are plots of a priori specifications of uniform low-pass optical transfer functions provided by the spatial filter in various embodiments of the present invention.
Figure 4:
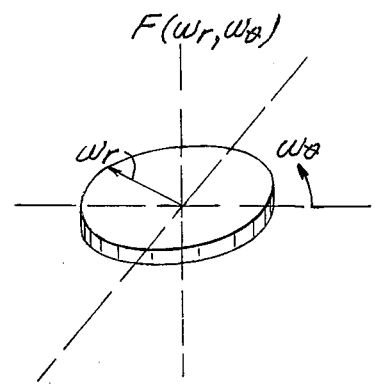

The method of making the spatial filter hologram 24 of the present invention is generally described and claimed in the afore-referenced co-pending patent application Ser. No. 672,614, the disclosure of which is here incorporated by reference. In practicing such a method, a real, two-dimensional a priori design optical transfer function is first specified. In the present invention, this optical transfer function hereinafter denoted as $F'(\omega)$ is defined for an interval of spatial frequencies $0 < \omega < \Omega$ where $\Omega$ is less than the cutoff spatial frequency of the lens used in the system. These are the regions of spatial frequencies over which the optical transfer function is controlled. Many such functions are well known and are readily expressed in a variety of coordinate systems. Plots of two representative uniform, low-pass optical transfer functions are shown in FIGS. 3 and 4.

In order to selectively filter spatial frequencies, the spatial filter 24 is designed to have a practical cutoff spatial frequency $\omega_c$ which particular frequency is usually chosen to be somewhat less than $\Omega$. This ensures that the system response will be zero in a band immediately above the selected cutoff spatial frequency $\omega_c$. In the examples described hereinafter, $\Omega$ was arbitrarily chosen to be $2\pi$. The practical cutoff spatial frequency $\omega_c$ was similarly chosen to be $\pi$.

The optical transfer function is the Fourier transform of a point spread function of an optical system which relates the Fourier transform of the processed (or output) image intensity to the Fourier transform of the illuminated object intensity. Accordingly, the second step in making the spatial filter 24 involves generating a two-dimensional mask having regions of varying optical transmissivity or reflectivity, which mask is a representation of a point spread function which corresponds to the a priori designed optical transfer function. Once the required point spread function is generated, the function is drawn with a computer plotter and then photoreduced to form the mask. Coherent light is then impinged onto the mask and light passing through the mask is impinged onto a medium responsive to the light. The passed coherent light is interferred with a reference beam which is coherent with the other beam at the medium to produce as the spatial filter a hologram corresponding to the mask.

The step of forming the mask includes the sub-steps of producing a medium including a planar surface having a rectangular coordinate grid including a plurality of regularly spaced regions, and developing the optical transmissivity or reflectivity of each region such that regions symmetrically disposed with respect to the coordinate axes of the grid, thereby corresponding to a real optical transfer function $F(\omega)$, have the same optical transmissivity or reflectivity. The transmissivity or reflectivity of each region is defined in x-y coordinates in terms of the inverse Fourier transform of an orthogonal series expansion of the selected design transfer function, $F'(\omega)$ over the range $0 < \omega_x \Omega_x$ and $0 < \omega_y < \Omega_y$, according to the following expression:

$$F(\omega_x,\omega_y) = \sum_{m=1}^{\infty} \sum_{n=1}^{\infty} \psi_{mn} \left( \frac{2 \sin \frac{m\pi}{\Omega_x} \omega_x}{\omega_x} \right) \left( \frac{2 \sin \frac{n\pi}{\Omega_y} \omega_y}{\omega_y} \right).$$

This expression may then be inverse transformed into the corresponding point spread function $h(x,y)$. The expression of $F(\omega_x,\omega_y)$ can be shown to be in terms of the complete orthogonal set $[\sin {}^k n^\delta/\delta]$. In practice, the upper limits of the series are taken to be finite integers M and N to allow physical construction of the corresponding point spread function $h(x,y)$. The coefficients of the expression are given by $$\psi_{mn} = \frac{1}{\Omega_x \Omega_y} \int_0^{\Omega_x} \int_0^{\Omega_y} \omega_x \omega_y F'(\omega_x,\omega_y) \sin(m\pi \frac{\omega_x}{\Omega_x}) \sin(n\pi \frac{\omega_y}{\Omega_y}) d\omega_x d\omega_y.$$

Accordingly, the point spread function is given by the following expression:

$$h(x,y) = \sum_{m=1}^{M} \sum_{n=1}^{N} \psi_{mn} \, \text{rect}\left(\frac{\Omega_x x}{m\pi}\right) \text{rect}\left(\frac{\Omega_y y}{n\pi}\right),$$

wherein $h(x,y)$ is the point spread function corresponding to an a priori design optical transfer function $F'(\omega_x,\omega_y)$, $m,n$ are spatial limits in the x and y directions, respectively, $\omega_x$ is the spatial frequency along the x-direction,
$\omega_y$ is the spatial frequency along the y-direction,
$\Omega_x$ is the cutoff spatial frequency in the x-direction,
$\Omega_y$ is the cutoff spatial frequency in the y-direction, $\text{rect} \frac{(\Omega_x x)}{m\pi} = 1$ for $0 < |x| < \frac{m\pi}{\Omega_x}$, $\text{rect} \frac{(\Omega_x x)}{m\pi} = 0$ for $|x| > \frac{m\pi}{\Omega_x}$, $\text{rect} \frac{(\Omega_y y)}{m\pi} = 1$ for $0 < |y| < \frac{n\pi}{\Omega_y}$, $\text{rect} \frac{(\Omega_y y)}{n\pi} = 0$ for $|y| > \frac{n\pi}{\Omega_y}$, $$\psi_{mn} = \frac{1}{\Omega_x \Omega_y} \int_0^{\Omega_x} \int_0^{\Omega_y} \omega_x \omega_y F'(\omega_x,\omega_y) \sin(m\pi \frac{\omega_x}{\Omega_x}) \sin(n\pi \frac{\omega_y}{\Omega_y}) d\omega_x d\omega_y,$$

$F'(\omega_x,\omega_y)$ is the a priori design optical transfer function of the desired spatial filter, and is defined between the limits $0 < \omega_x < \Omega_x$ and $0 < \omega_y < \Omega_y$, such that $$F(\omega_x,\omega_y) = R[\frac{1}{A} F'(\omega_x,\omega_y) + \frac{B}{A} \delta(\omega_x,\omega_y)],$$

where $R = A/1+B$, A is a multiplier constant equal to the maximum value of $h(x,y)$ minus the minimum value of $h(x,y)$ and B is a bias constant equal to the negative of the minimum value of $h(x,y)$, thereby enabling the point spread function $h(x,y)$ corresponding to the optical transfer function $F(\omega_x,\omega_y)$ to be real and in the range $0 \leq h(x,y) \leq 1$.

The factor R equals 1 except in those instances where $h(x,y)$ is outside the interval $0 \leq h(x,y) \leq 1$ in which case the point spread function is not realizable. In such instances $h(x,y)$ is normalized and biased so that it will fall within the interval zero and one according to the following expression:

$$h'(x,y) = \frac{1}{A}[h(x,y) + B]$$

Thus, in those instances where $h(x,y)$ is outside the interval $0 \leq h(x,y) \leq 1$, it is the normalized function $h'(x,y)$ that is generated to provide the mask used in producing the spatial filter.

It is recognized that a two-step procedure may also be used to realize negative going point spread functions. In such a procedure, the point spread function is divided into positive and negative going portions. The positive portion is generated and used to obtain a processed image as specified herein, while the negative of the negative going portion is separately generated and similarly used. The resultant two incoherent optical processing systems are combined in such a way as to obtain the difference between the positive and negative processed images. With this approach, a broader range of applications can be effected.

In another embodiment, the two-dimensional mask representing a point spread function may be generated from an a priori optical transfer function expressed in circular coordinates as $F'(\omega_r, \omega_\eta) = F'(\omega_r)$, wherein the point spread function is $$h(r) = \sum_{j=1}^{m} \psi_j \, \text{circ}(r/a_j), \text{ wherein}$$

$a_j$ is the spatial limit along the r-axis,
$\omega_r$ is the spatial frequency along the r-axis,
$\Omega_r$ is the cutoff spatial frequency in the r-direction,
circ $(r/a_j) = 1$ for $0 \leq r \leq a$,
circ $(r/a_j) = 0$ for $r > a$, $$\psi_j = \frac{1}{\pi \Omega^2 a_j J_2^2(a_j \Omega)} \int_0^{\Omega} \omega_r^2 \, F'(\omega_r) J_1(a_j \omega_r) d\omega_r,$$

and the coefficients $a_j$ are the solutions to:

$J_1(a_j \Omega) = 0$ for $j = 1, 2, \ldots$ $F'(\omega_r)$ is the a priori design optical transfer function of the desired spatial filter and is defined between the limits $0 < \omega_r < \Omega$ such that $$F(\omega) = R[\frac{1}{A} F'(\omega) + \frac{B}{A} \delta(\omega_r)], \text{ where}$$

$R = A/1+B$, A is a multiplier constant equal to the maximum value of $h(r)$ minus the minimum value of $h(r)$, and B is a bias constant equal to the negative of the minimum value of $h(r)$, thereby enabling the point spread function $h(r)$ corresponding to the optical transfer function for $F(\omega)$ to be real and in the range $0 \leq h(r) \leq 1$.

When $h(r)$ is outside the interval $0 \leq h(r) \leq 1$, it is also normalized in the same manner as described above for $h(x,y)$.

With reference to these two equations, $h(x,y)$ and $h(r)$, although $M$ and $N = \infty$ in theory, a small number is usually sufficient, such as $M = N = 10$. $M$ and $N$ are chosen empirically to give an approximation of the required accuracy.

Once the required point spread function is generated, the function is drawn with a computer plotter and then photo reduced to form the mask. A mask is produced which, when illuminated with coherent light, will impart a spatial intensity distribution in accordance with the point spread function. For example, a computer and plotter may be used to produce a halftone drawing of the point spread function.

For the examples described hereinafter, it is necessary to provide a normalized point spread function $h'(x,y)$ or $h'(r)$ as described above. The total area is divided into homogeneous resolution cells, and the cell dimensions are selected to provide the resolution desired. The blackened area of any cell is a function of the spatial intensity. This procedure provides a negative of $h'(x,y)$.

Although a computer-plotter approach is described, other approaches may be utilized, such as photographing the display of a graphic display terminal. In addition, the resultant mask could be photo reduced or photo enlarged prior to producing the spatial filter.

Examples of optical systems for image processing of incoherent light with a spatial filter providing a low pass uniform response are provided. These systems may be included in an apparatus for making copies of graphic images. These systems are distinguished from one another by the design characteristics of the spatial filter 24.

EXAMPLE 1

In one embodiment, the spatial filter provides the optical transfer function such that a low pass uniform response is provided for all spatial frequency components within a spatial frequency interval below a preselected cutoff frequency $\omega_{cx}$ or $\omega_{cy}$, and such that those frequency components above the cutoff frequency are substantially attenuated. In this manner, the diffuseness of graphic images, which diffuseness is attributed to the reduction of high spatial frequencies within the interval, such as occurs during multigeneration copying, is substantially eliminated. Typically, the reduction in overall contrast which similarly occurs is conveniently overcome by increasing the contrast or exposure level during the copying operation.

In this embodiment, the optical transfer function $F(\omega)$ is conveniently expressed as follows:

$$F(\omega_x, \omega_y) = R[\frac{1}{A} F'(\omega_x, \omega_y) + \frac{B}{A} \delta(\omega_x, \omega_y)],$$

where $\delta(\omega_x, \omega_y)$ is the Dirac delta function, $F'(\omega_x, \omega_y)$ is the design specification, dictated by the desired low-pass response, $R = A/1+B$, $A$ = a multiplier constant equal to the maximum value of the corresonding point spread function $h(x,y)$ minus the minimum value of $h(x,y)$, and $B$ = a bias constant equal to the negative of the minimum value of $h(x,y)$. $A$ and $B$ are selected to enable the point spread function $h(x,y)$ corresponding to the transfer function $F(\omega_x, \omega_y)$ to be real and in the range of $0 \leq h(x,y) \leq 1$.

A convenient expression defining the design specification for the transfer function $F'(\omega_x, \omega_y)$ in rectangular coordinates is $$F'(\omega_x, \omega_y) = rect\ (\omega_x/\omega_{cx})\ rect\ (\omega_y/\omega_{cy})$$

where $\omega_{cx}$ and $\omega_{cy}$ are a cutoff spatial frequencies in the $x$ and $y$ directions respectively, $rect\ (\omega_x/\omega_{cx}) = 1$ for $0 \leq |\omega_x| \leq \omega_{cx}$ $rect\ (\omega_x/\omega_{cx}) = 0$ for $|\omega_x| > \omega_{cx}$ $rect\ (\omega_y/\omega_{cy}) = 1$ for $0 \leq |\omega_y| \leq \omega_{cy}$ $rect\ (\omega_y/\omega_{cy}) = 0$ for $|\omega_y| > \omega_{cy}$ and $$\omega_{cx} = \omega_{cy}$$

A plot of this design specification in frequency space is shown in FIG. 3.

Once the transfer function $F(\omega_x, \omega_y)$ is selected, the coefficients for the function may be determined from the following expression:

$$\psi_{mn} = \frac{1}{\Omega_x \Omega_y} \int_0^{\Omega_x} \int_0^{\Omega_y} \omega_x \omega_y F(\omega_x, \omega_y) \sin(\frac{m\pi}{\Omega_x} \omega_x) \sin(\frac{n\pi}{\Omega_y} \omega_y) d\omega_x d\omega_y$$

Upon insertion of the expression for $F'(\omega_x, \omega_y)$, $\psi_{mn}$ may be solved as follows:

$$\psi_{mn} = \frac{4}{m^2 n^2 \pi^2} \{\sin(\frac{m\pi}{2}) - \frac{m\pi}{2} \cos\frac{m\pi}{2}\} \{\sin(\frac{n\pi}{2}) - \frac{n\pi}{2} \cos\frac{n\pi}{2}\}$$

Figure 5:
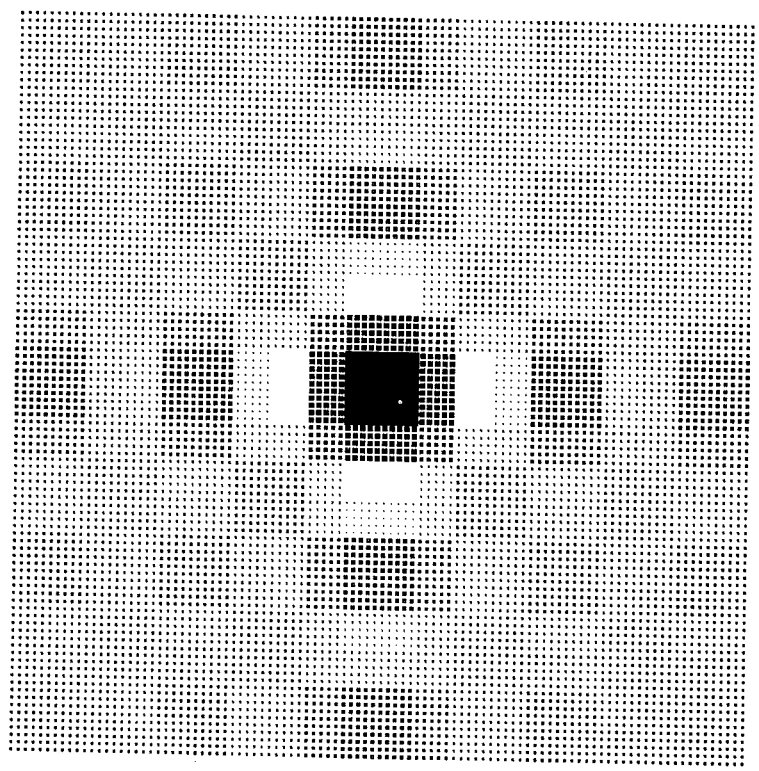
FIG. 5 is a plot of a point spread function utilized to form a mask which in turn is used to form the spatial filter hologram corresponding to the optical transfer function of FIG. 3.

The resulting incoherent point spread function is:

$$h(x,y) = \sum_{m=1}^{10} \sum_{n=1}^{10} \psi_{mn}\ rect(\frac{2x}{m})\ rect(\frac{2y}{n}),$$

and may be plotted as is shown in FIG. 5 to form a mask corresponding to the point spread function. The mask is used to form the spatial filter, i.e., the Fourier transform hologram according to the method outlined in conjunction with the discussion of FIG. 2 hereinabove. The hologram may then be used as the spatial filter in the system of FIG. 1.

EXAMPLE 2

In another embodiment, the optical transfer function may be selected with respect to a circular coordinate system. In such a system, the optical transfer function is given in terms of:

$$F(\omega_r) = R[\frac{1}{A} F'(\omega_r) + \frac{B}{A} \delta(\omega_r)],\ \text{where}$$

$\delta(\omega_r)$, $F'(\omega_r)$, $R$, $A$ and $B$ are previously defined, modified to correspond to circular coordinates.

A convenient expression defining the design specification for the optical transfer function $F(\omega_r, \omega_{74})$ in radial coordinates is $$F'(\omega_r) = \text{circ}(\omega_r/\omega_{cr})$$

were $\omega_{cr}$ is cutoff spatial frequency along the $r$ axis, $$\text{circ}(\omega_r/\omega_{cr}) = 1 \text{ for } 0 \leq \omega_r \leq \omega_{cr}$$

and $$\text{circ}(\omega_r/\omega_{cr}) = 0 \text{ for } \omega_r > \omega_{cr}$$

Once the optical transfer function $F'(\omega_r)$ is selected, the coefficients for the function may be determined in an analogous manner to that set forth in Example 1. The point spread function for the optical transfer function may then be determined, plotted, and used as a mask to form the spatial filter according to the method outlines hereinabove.

Full color processing may also be accomplished by using color separation techniques. The number of spatial filter holograms controlling the optical transfer functions of the resultant systems which would then be utilized preferably would be the same as the number of sources of spatially incoherent monochromatic light. Accordingly, color processing may be accomplished in the embodiments of the present invention in a manner consistent with the foregoing examples by including a spatial filter that provides a plurality of discrete optical transfer functions for respectively spatially filtering a plurality of discrete color components of the light distributed from said object. In the color processing embodiments, it is also preferred that the incoherent light source of the system include means for providing incoherent light consisting of the same plurality of discrete color components.

Figure 2:
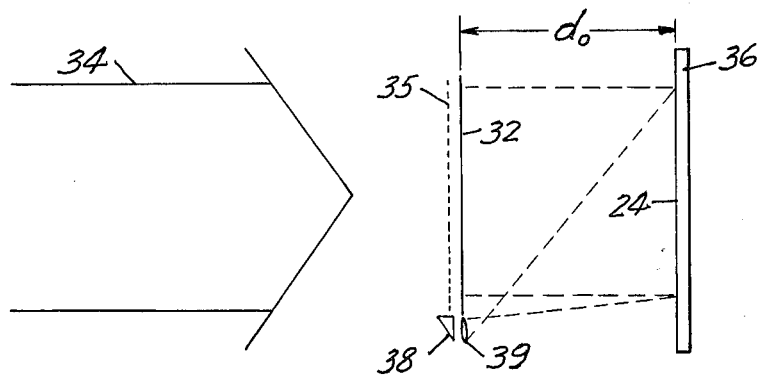
FIG. 2 is a schematic representation of the method of making a spatial filter according to the present invention.

The spatial filter hologram to be used in a system to provide such a plurality of optical transfer functions is holographically recorded, as described with reference to FIG. 2 above, by multiple exposure of the holographic medium 36 to monochromatic beams of each of the desired color component wavelengths. The intensity distribution for each wavelength is in accordance with the point spread function corresponding to the a priori design optical transfer function desired for each such wavelength.

In the color processing embodiments, it is necessary to suppress undesired intermodulation terms that inherently are produced. This is accomplished by providing the reference beam at such an angle during production of the spatial filter (FIG. 2) that the intermodulation terms will not overlap when the spatial filter is used in the processing system (FIG. 1) and also by the positioning of an aperture in the image plane 27, such that only the desired correct composite color image will be detected.

Objects containing graphic images may include but are not limited to documents: three-dimensional figures or scenes; self-luminous objects in either one, two, or three dimensions; and transparencies.

Having thus described the present invention, what is claimed is:

1. In an apparatus for making copies of graphic images, said apparatus including an optical system for image processing comprising
   (i) a souce of spatially incoherent light positioned for directing said light to an object containing said graphic image to provide an intensity distribution of light from said object; and
   (ii) a lens for providing a processed image of said light distributed from said object at a predetermined image plane;
   the improvement wherein said optical system further comprises
   a spatial filter which is a Fourier transform hologram containing a two-dimensional point spread function and which when combined with said lens in said optical system as a lens pupil for processing incoherent light, spatially filters said light distributed from said object to attenuate predetermined spatial frequency components within an interval of spatial frequencies $0 < \omega < \Omega$ and interacts with the lens to provide at the predetermined image plane processed convolution and/or correlation images of said filtered light distributed from said object, wherein within said processed convolution and/or correlation images the transmissivity or reflectivity of the hologram causes the optical transfer function to controllably attenuate spatial frequency components outside said interval of spatial frequencies and to substantially unalter the spatial components within said interval to thereby provide said graphic image at the image plane in which the higher spatial frequency components which contribute to fidelity in multigeneration copies are substantially unaltered.

2. An apparatus according to claim 1, characterized by
   the spatial filter providing a substantially uniform low-pass response for passing all spatial frequency components above zero spatial frequency to a specified cutoff spatial frequency $\omega_c$.

3. An apparatus according to claim 2, wherein the spatial filter is characterized by an optical transfer function:

$$F(\omega_r) = R[\frac{1}{A} F'(\omega_r) + \frac{B}{A} \delta(\omega_r)], \text{ where}$$

$F'(\omega_r)$ is the priori design optical transfer function of the desired spatial filter, according to the expression $$F'(\omega_r) = \text{circ}(\omega_r/\omega_{cr})$$

wherein
$$\text{circ}(\omega_r/\omega_{cr}) = 1 \text{ for } 0 \leq \omega_r \leq \omega_{cr}$$

and $$\text{circ}(\omega_r/\omega_{cr}) = 0 \text{ for } \omega_r > \omega_{cr}$$

wherein $R = A/1+B$, wherein A is the multiplier constant equal to the maximum value of the corresponding point spread function $h(r)$ minus the minimum value of $h(r)$, and B is a bias constant equal to the negative of the minimum value of $h(r)$, thereby enabling $h(r)$ for $F(\omega_r)$ to be real and in the range $0 \leq h(r) \leq 1$.

4. An apparatus according to claim 2, wherein the spatial filter is characterized by an optical transfer function:

$$F(\omega_x, \omega_y) = R[\frac{1}{A} F'(\omega_x, \omega_y) + \frac{B}{A} \delta(\omega_x, \omega_y)],$$

where $F'(\omega_x,\omega_y)$ is the a priori design optical transfer function of the desired spatial filter, according to the expression $$F'(\omega_x,\omega_y) = \text{rect}(\omega_x/\omega_{cx})\, \text{rect}(\omega_y/\omega_{cy})$$

wherein $$\text{rect}(\omega_x/\omega_{cx}) = 1 \text{ for } 0 \leq |\omega_x| \leq \omega_{cx}$$

$$\text{rect}(\omega_x/\omega_{cx}) = 0 \text{ for } |\omega_x| > \omega_{cx}$$

$$\text{rect}(\omega_y/\omega_{cy}) = 1 \text{ for } 0 \leq |\omega_y| \leq \omega_{cy}$$

$$\text{rect}(\omega_y/\omega_{cy}) = 0 \text{ for } |\omega_y| > \omega_{cy}$$

$$\omega_{cx} = \omega_{cy}$$

$$R = A/1+B$$

A is a multiplier constant equal to the maximum value of the corresponding point spread function $h(x,y)$ minus the minimum value of $h(x,y)$ and B is a bias constant equal to the negative of the minimum value of $h(x,y)$, thereby enabling the point spread function $h(x,y)$ for $F(\omega)$ to be:

$$0 \leq h(x,y) \leq 1.$$

5. An apparatus according to claim 1, wherein the spatial filter provides a plurality of discrete optical transfer functions for respectively spatially filtering a plurality of discrete color components of said light distributed from said object.

6. An apparatus according to claim 5, wherein the incoherent light source comprises means for providing incoherent light consisting of said plurality of discrete color components.

* * * * *

UNITED STATES PATENT AND TRADEMARK OFFICE
CERTIFICATE OF CORRECTION

PATENT NO. : 4,082,429
DATED : April 4, 1978
INVENTOR(S) : Joseph E. Ward, III and John C. Huber It is certified that error appears in the above-identified patent and that said Letters Patent are hereby corrected as shown below:

Column 5, line 29, delete the entire expression for $\psi_{mn}$.

Column 5, line 39, change "where" to -- . This Dirac delta function represents a zero frequency or background component which is added to the processed image by the bias term, B, when present in the point spread function. --

Column 6, line 12, change "$F'(\omega_r \omega_{74}) = F'(\omega_r)$" to -- $F'(\omega_r \omega_\theta) = F'(\omega_r)$,--.

Column 8, line 66, change "$F'(\omega_r \omega_{74}) = F'(\omega_r)$" to -- -- $F(\omega_r, \omega_\theta)$ --.

Signed and Sealed this

Twelfth Day of September 1978

[SEAL]

Attest:

RUTH C. MASON
Attesting Officer

DONALD W. BANNER
Commissioner of Patents and Trademarks